Patented Mar. 30, 1954

2,673,825

UNITED STATES PATENT OFFICE 2,673,825

PROCESS OF MANUFACTURING VAPOR PERMEABLE FLUID REPELLENT FABRICS

Lawrence P. Biefeld, Granville, and Albert R. Morrison, Newark, Ohio, assignors to Owens-Corning Fiberglas Corporation, Toledo, Ohio, a corporation of Delaware No Drawing. Application August 26, 1949, Serial No. 112,653

5 Claims. (Cl. 154—128)

This invention relates to the production of a vapor permeable, fluid repellent fabric and especially a fabric of the type described reinforced with glass fibers.

When glass fibers are incorporated in a manner to contribute to the characteristics of the fabric without impairing the development of vapor permeability or water repellency, the resulting product is a vast improvement over materials heretofore used in such applications as lightweight tarpaulin, awnings, seat covers, and the like. The product has leather-like characteristics and may be used to advantage in the manufacture of wearing apparel, shoes, purses, luggage, upholstery, and the like. The incorporated glass fibers lend to the fabric the characteristics of tensile and flexure strength, inertness, wear, abrasion, and scuff resistance, dimensional stability, heat stability, and resistance to solvents, chemicals, weather, and electrical currents, just to name a few. One of the difficulties involved in the fabrication with glass fibers resides in the problem of securing water or fluid repellency and vapor permeability while, at the same time, deriving the benefits attributed to glass fibers.

It is an object of this invention to produce a vapor permeable, fluid repellent fabric and to provide a method for producing the same.

Another object is to produce a vapor permeable, fluid repellent fabric having leather-like characteristics but which, in many respects, is a vast improvement over leather, particularly with respect to water repellency as well as many of the physical characteristics described.

A further object is to produce a vapor permeable, water or fluid repellent fabric incorporating glass fibers as a reinforcement and as an agent to improve many of the physical characteristics of the fabric.

A still further object is to provide a simple and efficient method for manufacturing a vapor permeable, water or fluid repellent fabric in which glass fibers lend many of the desirable attributes to produce a new and improved fabric adapted as an improved article of manufacture for many uses for which materials presently available are unadapted.

We have succeeded in effecting an arrangement of materials to produce a new and improved fabric having the desired characteristics. In carrying out our invention, there is first formed a base fabric consisting essentially of glass fibers in combination with a polyphase system filling the interstices between the fibers. The polyphase system includes a removable phase interspersed with a phase of high polymeric material which is impervious to water or fluid, as the case may be. The removable phase should have the characteristic of partial or complete removal without affecting the arrangement or the characteristics of the high polymeric or continuous phase. Upon removal of the removable phase, a microporous product is left through which vapors but not fluids or water may freely travel. In this arrangement, the high polymeric substance forms the continuous phase, and when it is selected for its adherence to glass fiber surfaces, the fabric is strengthened and improved in many physical characteristics by the presence of glass fibers.

Excellent results are secured when the removable phase is incompatible with the continuous phase to the extent that each substantially retains its own identity and characteristics in the base fabric. Extraction then can be easily effected by exposure of the base fabric to conditions which affect one phase to a much greater extent than the other to enable the separation. Extraction, for example, may be effected from a solvent system which dissolves the removable phase without so affecting the other phase, and extraction, therefore, is carried out on the principle of selective solvency. Removal may also be effected by exposure of the base fabric to conditions which reduce the phase to flowable condition without affecting the continuous phase, enabling their separation with or without the aid of reduced pressures. For this purpose, solvent means may be used in which absorption of the solvent in the removable phase reduces the compound to flowable condition. It may also be effected by heating systems in combination with, or without, the solvents or reduced atmospheres. Heating may be carried out by exposing the polyphase system to elevated temperatures or by selectively heating the removable phase when constituted of materials affected by electronic means. Although incompatibility is desirable between the various phases, acceptable results may be secured with the use of partially compatible systems, but even when these are used, it is desirable that each component retain its separate identity and it is desirable that the combination be effected without completely blending the various phases.

Vapor permeability and water or fluid repellency depend largely upon the materials used, the porosity of the fabric, the continuity of the pore-like openings through the fabric, and the dimensional characteristics of the openings through the fabric. We believe that best results are secured when the polyphase system is constituted with less than ⅓ of the removable phase when calculated on the basis of solids by weight. The lower limit is difficult to establish because permeability of a lesser degree is secured when less of the removable phase is used, but, nevertheless, a system originally constituted with as little as 5 percent of the removable phase is still vapor permeable and water or fluid repellent. Very good results are secured when, in the final product the materials are present in the ratio of about 10 parts of glass fibers to 5 to 40 parts impregnant when measured on a volumetric basis, and best results follow the practice of using about 10 parts of glass fibers and 10 to 20 parts of impregnant on the volumetric basis.

The removable phase may appear in the base fabric in various forms. It may comprise one of the components of a polyphase system including the high polymeric material and with which a matrix of glass fibers in fabric form is impregnated. Instead of employing a matrix of glass fibers, the glass fibers in rather high concentration may be suspended in the polyphase impregnating system which is then laid down as a fabric in sheet form or molded to desired shape. Extraction of the removable phase after the impregnating materials have set leaves pore-like openings through which vapors but not fluids or water may pass. When desired, a polymerizing step may be interposed between impregnation and extraction to advance the continuous phase to a stage wherein it is unaffected by the extracting medium.

The removable phase may be in the form of synthetic resinous fibers intermixed with the glass fibers, as disclosed in the Francis Patents Nos. 2,253,000 and 2,357,392, and the resulting composite impregnated with the high polymeric material. The impregnant forms the continuous phase, and after it has set, the synthetic resinous fibers may be extracted from the composite to leave openings of pore-like dimensions corresponding to the dimension of the extracted fibers. Although it is possible to employ compatible materials as the removable fibrous phase and as the continuous high polymeric impregnant, especially if the former is incapable of sufficient flow during impregnation to blend completely with the impregnant, best results are secured when each substance retains substantially its own identity in the base fabric. In addition to extraction by solvency or heat means, as described in connection with the previous system, the fibers may be mechanically withdrawn, especially when the continuous phase is softened or when the continuous phase is selected of material with which a strong bond is not developed with the extractable fibers.

Alternatively, the removable phase may be a coating applied to the surfaces of part or all of the glass fibers before or after fabric formation but prior to impregnation with the high polymeric material which forms the continuous phase in the base fabric. If the high polymeric substance is selected to be strongly adherent to the surfaces of the glass fibers, the uncoated fibers are interbonded in a manner to reinforce the fabric. The coating then comprises the removable phase which, preferably, is incompatible with the high polymeric material and retains its individual identity to enable extraction by solvent or heat means in the manner previously described. The extent of the openings left by the extracted phase depends chiefly on the dimension of the glass fibers, the thickness of the applied coating, and the relationship from the standpoint of surface attraction between the coating and the continuous phase. The factors are easily regulated to produce a fabric which, when the coating is partially or completely extracted, has openings of pore-like dimensions through which vapors but not fluids or water may pass.

The matrix of glass fibers may be formed in many ways. It may comprise staple glass fibers haphazardly arranged in jackstraw fashion into a mat of predetermined thickness or preformed to desired shape. Self-sufficiency of the mat may be secured by interfelting or by the use of a binder or combinations thereof. If the fabric is formed at the station of use, self-sufficiency may be derived by impregnation of the mat with part or the full complement of impregnant. The matrix may be a textile, a woven or a knitted fabric formed of threads, yarns, or strands of glass fibers in untwisted, twisted, or intertwisted form. When a relatively thick layer or built-up laminate is desired as the final product, it is best to employ a fabric in which the fibers are able to move relative to one another, such as in a mat or knitted cloth.

Glass fibers of various diameter ranging to 30 microns or less may be used. When ultra-fine glass fibers are used, in the range of 3 microns or less, the interstices between the fibers appear to be more substantially blocked by the fuzzy ends of the fibers, and a fabric having exceptionally good properties is produced. It is conceivable that the fabric may comprise a mixture of ultra-fine fibers with fibers of larger diameter and that the base fabric may comprise a textile of glass fibers and other glass fibers which have been embodied as a filler in the impregnant. A small amount of other natural fibers, such as natural cotton, wool, silk, and hemp fibers or synthetic resinous fibers may advantageously be used in the matrix.

Depending upon the method of fabrication and extraction, the materials which comprise the removable phase may be selected from a wide variety of substances. When removal is by water extraction, the material which comprises the removable phase should be water soluble. Representative of such materials are the polyglycols which comprise polymers of polyhydric alcohols, such as ethylene glycols. It may be a polyvinyl alcohol which is soluble in cold or hot water or aqueous alkaline solutions. Representative of other suitable materials are the cellulose ether derivatives which are soluble in water or dilute alkaline solutions including hydroxy alkyl cellulose (hydroxy ethyl cellulose), lower alkylated cellulose ethers, such as methyl cellulose and ethyl cellulose having less than ⅓ alkoxy groups, and alkali metal salts of carboxy cellulose ethers, such as sodium carboxy methyl cellulose and the like. It might even comprise other carbohydrates and proteins of the type gelatin, casein, and the like.

When selective solvency is to be employed as the method for extracting the removable phase, materials soluble in water and various organic solvents in which the continuous phase is insoluble may be used. Suitable materials soluble in water or in dilute alkaline solutions have been described. Materials soluble in organic solvents and which may be used in combination with high polymeric substances insoluble in the respective solvent will be pointed out in numerous specific examples. However, when extracting on the principle of selective solvency, it is best to employ as the removable phase a material which is readily soluble in the more common solvents. Suitable materials are the cellulose ethers (soluble in acetone), polystyrene (soluble in hydrocarbons), hydroxy alkyl ethers of cellulose (soluble in water), waxes and oils (soluble in hydrocarbons), polyvinyl acetate and vinyl copolymers (soluble in esters), and the like. Use may also be made of systems wherein the solvent employed reduces the removable phase to fluid consistency, enabling the materials to flow from the base fabric with or without the aid of reduced atmospheres.

When removal is to be effected by flow either with or without the aid of vacuum, the removable phase is selected of a material which may be reduced to fluid consistency at temperatures at which the continuous phase is not yet flowable. These flowable characteristics are possessed by thermosetting resinous materials which have not been reacted to the full extent of polymeric growth and by many of the thermoplastic materials and resins. Some thermoplastics are reduced to fluid consistency at elevated temperatures, and these are preferred. Others are merely softened or capable of plastic flow and cannot be used unless vacuum means or other means are employed to increase the flowability of the resinous materials. Representative of materials suitable for extraction in a thermal system are the oils of animal, vegetable, or mineral sources which are more or less non-drying in character; waxes including animal, vegetable, and mineral waxes, and other materials of a waxy nature though not the equivalent of waxes, such as fatty acids and ester derivatives thereof, polyglycols, and chlorinated hydrocarbons, such as chlorinated paraffins; resinous materials, such as cellulose derivatives including methyl cellulose, ethyl cellulose, and the like. As previously pointed out, fluidity may be aided by the simultaneous use of solvent means.

As the continuous phase, use is made of high polymeric substances impervious to water or to a selected fluid, the passage of which it is desired to prevent by the fabric. Suitable high polymeric materials are usually selected of resinous or rubber-like substances which are comparatively unaffected by the means for extracting the removable phase. Among the resinous materials which may be used are the polyacrylates represented by polymethyl methacrylate, polyethyl acrylate, polybutyl methacrylate, polyfunctional polyacrylates of the heat hardenable type, and the like; polyvinyl compounds including polyvinyl chloride, vinyl chloride-vinyl acetate copolymer, polyvinylidene chloride and copolymers thereof with vinyl chloride; polyesters and alkyds of the saturated and unsaturated type, and copolymers thereof with monomeric vinyl derivatives and styrene; polyamides, and heat hardenable resinous materials, such as the phenolics, and urea and other amino resins. Excellent use is made of the organo-silicon polymers and elastomers, generally referred to as silicones or polysiloxanes in which silicon-oxygen or silicon-carbon bonds comprise the nuclear structure to which alkyl radicals and derivatives are attached. Elastomers including natural rubber and synthetic rubbers may be used. The latter include chloroprene, butadiene acrylonitrile copolymers, butadiene-styrene copolymers, and admixtures thereof with phenolic resinous materials and the like. When desired, these elastomers may include vulcanizing agents and they may be converted to their vulcanized stage before or after extraction of the removable phase.

Ordinarily, the flexible modifications of the materials comprising the continuous phase are desired, but in the event that the materials in themselves are substantially inflexible, the desired characteristic may be secured by the incorporation of suitable plasticizers. The continuous phase may be further modified, if desired, by the incorporation of fillers, bulking agents, pigments, heat stabilizers, anti-oxidants, and the like.

No matter which system is used, best results are secured when a thin base fabric is prepared because extraction of the removable phase may be easily and quickly effected by the selected system. In the event that a thicker product is desired, two or more layers may be laminated together. Other advantages may be secured by the lamination technique, such as the reduction of pore size during the lamination, and it insures against the presence of large openings through which fluids or water may pass. It is unnecessary completely to remove the extractable phase in order to secure vapor permeability.

The following examples set forth various substances which may be used in combination to provide polyphase systems having the desired characteristics and they describe the technique by which one phase is removed from the base fabric to provide a vapor permeable fluid repellent product. It will be understood that the concentrations of the substances or their ratios in the base fabric may vary according to the desires of the manufacture within the limitations previously pointed out.

*Example 1*

A textile fabric woven of glass fibers is impregnated with a polyphase system constituted with carbowax (polyethyleneglycol) as the removable phase and polymethyl methacrylate as the continuous phase. The impregnating composition is an aqueous system in which the carbowax is soluble and the polyacrylate is dispersible, the materials, comprising 50 percent of the composition, being present in the ratio of about 2 parts by weight of carbowax and 8 parts by weight polyacrylate. Impregnation is carried out by successively immersing the fabric in the composition, then driving off the diluent in a heating system maintained in a temperature range of 200° to 350° F. The cycle is repeated one or two times completely to impregnate the fabric. All or part of the carbowax is extracted from the impregnated fabric by water. The water may be run over the fabric, the impregnated fabric may be drawn through a water bath, or it may be immersed in water for a short time. Wetting agents may be used to increase the extraction rate. In the event that a built-up or relatively thick fabric is desired, several sheets of extracted fabric may be combined in a laminating process, employing heat and pressure to effect the desired fusion and integration of the layers.

*Example 2*

A thick mat of bonded glass fibers haphazardly arranged is impregnated with a composition having about 30 percent solids distributed between 1 part hydroxy ethyl cellulose (soluble in water) as the removable phase and 3 parts vinyl chloride-vinyl copolymer (in water emulsion) as the continuous phase. Impregnation and removal of the diluent may be effected in the manner described in connection with Example 1. It is desirable to employ elevated temperatures in the range of 300° F. for the removal of the diluent because, at the same time, the discrete particles deposited from the dispersion of the copolymer become fused to form the continuous phase. Water again comprises the means for extracting the hydroxy ethyl cellulose without affecting the structure or disposition of the vinyl chloride-vinyl acetate copolymer. The product, after water extraction, has pore-like openings in the region from which the hydroxy ethyl cellulose is extracted.

Example 3

A textile fabric formed of glass fiber yarns woven with cotton threads is impregnated by a dipping process with an "A" stage phenol-formaldehyde resin in water solution as the removable phase and polyvinyl chloride in aqueous emulsion as the continuous phase. About 2 percent octadecyl ammonium chloride, water repellent, is incorporated in the impregnating composition. When less than 60 percent total solids are contained in the impregnating composition, two or more passes may be necessary completely to impregnate the fabric, and following each pass through the impregnating bath, the impregnated fabric is exposed to temperatures sufficient to drive off the diluent but insufficient to convert the phenol-formaldehyde resin to an insoluble and infusible stage. Temperatures in the range of about 150° F. are sufficient. From the completely impregnated fabric, the phenol-formaldehyde phase may be removed by reducing the phenol-formaldehyde resin to fluid consistency upon exposure to elevated temperatures, enabling its flow from the fabric. Removal is accelerated if the heated fabric is subjected to vacuum forcibly to withdraw the fluid component.

Five layers of the extracted base fabric are placed between cooperating platens of an upright press and laminated together at about 320° F. and under 120 pounds pressure per square inch for fifteen minutes. The resulting product is a microporous laminate through which vapors but not fluids may freely pass.

Example 4

A knitted fabric of glass fibers is impregnated with a composition containing paraffin wax as the removable phase and a methyl phenyl polysiloxane resinous material as the continuous phase. Impregnation is effected from solvent solution in methyl ethyl ketone and when a 40 percent solution is used, about three passes followed by air drying are sufficient completely to impregnate the fabric. The base fabric may be exposed to a temperature of about 350° F. for a short time to advance the organo-silicon resin, and during the heat treatment, the paraffin wax is reduced to liquid consistency and is readily removed from the base fabric with the aid of vacuum. The product of this example is particularly well adapted as a vapor permeable, water repellent fabric of increased strength since the organo-silicon resins, in themselves, are water repellent and strongly adherent to the glass fibers of the fabric.

The foregoing examples describe systems wherein a fabric of glass fibers is impregnated with dilute solutions of the materials that are to comprise the polyphase system. Instead of employing dilute solutions of the materials comprising the removable and continuous phases in the impregnated system, higher concentrations may be used depending upon the method of impregnation. For example, when a knife coating, dip-squeeze, or roller coating is employed for impregnation, concentrations within the range of 60 to 90 percent, as in the organosols, may be used and even 100 percent concentrations, such as the plastisols, may be applicable.

Example 5

A mat formed of a mixture of 80 percent glass fibers and 20 percent cellulose acetate fibers, deposited in haphazard interfelted relation, is impregnated with vinylidene chloride-vinyl chloride copolymer (Saran) originally applied from solvent solution. The cellulose acetate fibers, which comprise the removable phase, are extracted by immersion of the impregnated fabric in acetone solvent. The continuous Saran phase is unaffected by acetone and, therefore, the resulting voids in the base fabric follow the positions formerly occupied by the extracted or partially extracted cellulose acetate fibers. It will be manifest that at the juncture of the cellulose acetate fibers, the voids will be interconnected and will provide continuous passages through the fabric corresponding dimensionally to the acetate fibers. After the removal of the extractable phase, two or more layers of the base fabric may be laminated together to comprise a product through which vapors but not fluids are able to pass.

Example 6

A fabric is formed by interweaving glass fibers and fibers formed of polystyrene and in which the polystyrene fibers comprise less than 30 percent of the mixture. The fabric is impregnated by a roller coating process with an organosol of vinyl acetate-vinyl chloride copolymer in 80 percent solution. Suitable impregnation is effected in a single application. The diluent is removed by exposure of the coated fabric to temperatures in the range of about 200° to 300° F. for ten to twenty minutes. The polystyrene fibers are extracted by hydrocarbons, such as benzene, which do not affect the vinyl acetate-vinyl chloride copolymers in any manner. The resulting sheet contains openings of pore-like dimensions through which vapors but not water may pass.

Example 7

A fabric is formed by matting together glass fibers and fibers of polyethylene in proportions ranging from 80 parts of glass fibers to about 20 parts of polyethylene. The fabric is impregnated with an aqueous emulsion containing 40 percent solids distributed between butadiene-acrylonitrile copolymer and about equal parts of an "A" stage phenol-formaldehyde resin. After the materials have been set by exposure to elevated temperatures, which activate the removal of the diluent by vaporization and the advancement of the continuous phase by polymerization, all or part of the polyethylene fibers may be removed by heating the composite to a temperature above the melting point of the material constituting the removable phase. In this instance a temperature of 400° to 500° F. for a short time is sufficient. When reduced to fluid consistency, the polyethylene may be extracted with the aid of vacuum.

Example 8

A fabric is formed of interwoven strands of glass fibers in which ⅓ of the glass fibers is coated with chlorinated paraffin. The fabric is then impregnated with a heat hardenable methyl ethyl polysiloxane resin dissolved in methyl ethyl ketone. When a 30 percent solution is used, four passes are sufficient fully to impregnate the fabric and solvent removal may be effected simply by air-drying. Extraction of the chlorinated paraffin coating some of the fibers is accomplished by reducing the coating substances to liquid consistency at elevated temperatures in the range of 350° to 400° F. The resulting product has openings of pore-like dimensions following the contour of the coated fibers and corresponding essentially with the thickness of the chlorinated paraffin coating on the glass fibers. At the junctures of the fibers, the openings intersect to provide continuous passages through which vapors but not water may pass.

*Example 9*

A knitted fabric is formed of glass fibers, part of which are coated with a polyglycol (carbowax) to provide a film thickness of about 1 to 4 mils on the surfaces of the glass fibers. The fabric of coated and uncoated fibers is impregnated with an emulsion of butadiene-acrylonitrile copolymer modified with about equal parts of "A" stage phenol-formaldehyde resin. Also suspended in the emulsion are about 30 percent by weight chopped glass fibers ranging up to ¼ inch in length. After the water has been removed following each passage of the fabric through the impregnating bath, the base fabric is exposed to temperatures in the range of 250° to 350° F. for about twenty to thirty minutes to insolubilize the materials comprising the continuous phase. Thereafter, the coating composition (carbowax) may be removed by water to provide openings of the desired dimension following the contours of the coated fibers in the fabric.

*Example 10*

A mat of haphazardly arranged glass fibers, some of which have been coated with polyvinyl acetate to provide a film of about 0.003 inch thickness, is impregnated with a 30 percent solvent solution of polyvinyl chloride. Ordinarily, three passes through the impregnated bath are sufficient to fill the interstices between the fibers. After removal of the diluent, an acetone extraction is used to remove the polyvinyl acetate. Four layers of the extracted base fabric are laminated together under 120 pounds per square inch pressure and 350° F. for fifteen minutes. The resulting product is a laminate through which vapors but not fluids can pass.

*Example 11*

Yarns are formed of glass fibers about ⅓ of which have been coated with hydroxy ethyl cellulose. The yarns are knitted into a fabric which is then impregnated by a roller-coating process with a plastisol constituted entirely of vinyl acetate-vinyl chloride copolymer and suitable plasticizer. The hydroxy ethyl cellulose on the coated fibers is extracted by water, and several layers of the extracted base fabric may be laminated together in the manner previously described.

The latter examples are directed to the coating of some or all of the fibers with an extractable material followed by impregnation with the substance that is to comprise the continuous phase. Coating of the glass fibers with the removable component may be effected in several ways. The fibers may be coated as they are attenuated from the molten glass screen by a suitable wiping or flow coating process. In such applications, the coating composition may comprise dilute solutions in the order of 2 to 10 percent or emulsions of like concentration. Alternatively, bundles of glass fibers in strand or yarn form may be coated prior to fabric formation, and, when desired, the fabric itself may be coated. It will be manifest that by the coating process the size of the openings will depend chiefly upon the thickness of the applied coating composition and upon the extent to which the coating is removed by extraction.

If the continuous phase is formed of a thermoplastic material, the size of the openings, when they are too large, may be reduced by causing the thermoplastic substances to flow. Flow of the desired character may be effected by pressure alone, by heat alone, or by combinations of heat and pressure. Flow is secured to a limited extent when two or more layers are laminated together, and it will be evident that by such technique, the size of the openings will be reduced and that the possibility of the existence of any large openings extending through the fabric may be minimized.

The degree of permeability of the extracted or laminated fabric may be modified by subsequent treatments. It may be treated with hydrophobic substances to increase water repellency, or it may be treated with hydrophilic substances to increase the permeability. Suitable hydrophobic substances ordinarily comprise hydrocarbons or constituents containing alkyl radicals having more than 10 carbon atoms in chain-like structure. Representative of suitable hydrophilic substances are the oils, waxes, metallic soaps, fatty acid esters, and the like. Excellent use is also made of the cationic active substances of the type described in the United States Letters Patent of Sloan, No. 2,356,542, or the Werner or chrome complexes of the type described by Iler, No. 2,273,040. The organo-silicon compounds of the type silanes or the liquid polysiloxanes may also be used.

It will be understood that numerous changes in the amounts of materials, the arrangements of materials, and the methods of extraction may be effected without departing from the spirit of the invention, especially as defined in the appended claims.

We claim:

1. The process of manufacturing a vapor permeable, water repellent fabric comprising the steps of forming a thin textile consisting essentially of glass fibers, impregnating the textile material substantially completely to fill the voids in the textile with a polyphase system having from 3–33 percent by weight of a removable phase of a water soluble organic material which is incompatible with the continuous phase forming the remainder and which consists of a thermoplastic resinous material selected from the group consisting of polyalkylacrylates, polyvinyl chloride, vinyl chloride-vinyl acetate copolymer, polyvinylidene chloride, butadiene-acrylonitrile copolymer and organo-silicon resins, contacting the impregnated textile with an aqueous medium to extract the water soluble organic materials leaving microporous openings through the impregnated textile through which vapor but not water is able to pass.

2. The process of manufacturing a vapor permeable, water repellent fabric comprising the steps of forming a thin textile of glass fibers, impregnating the textile substantially completely to fill the voids therein with a polyphase system having up to 33 percent by weight of a removable phase formed of a water soluble organic material selected from the group consisting of polyglycols and polyvinyl alcohols which are incompatible with the continuous phase forming the remainder of the polyphase system formed of a thermoplastic organic resinous material selected from the group consisting of polyalkylacrylates, polyvinyl chloride, vinyl chloride-vinyl acetate copolymer, polyvinylidene chloride, butadiene-acrylonitrile copolymer and organo-silicon resins, contacting the impregnated textile with an aqueous medium to extract the water soluble organic materials leaving microporous openings through the impregnated textile through which vapor but not water is able to pass.

3. The process of manufacturing a vapor permeable, water repellent fabric comprising the steps of forming a thin textile consisting essentially of glass fibers, impregnating the textile material substantially completely to fill the voids in the textile with a polyphase system having from 3–33 percent by weight of a removable phase of a water soluble organic material which is incompatible with the continuous phase forming the remainder and which consists of a thermoplastic resinous material selected from the group consisting of polyalkylacrylates, polyvinyl chloride, vinyl chloride-vinyl acetate copolymer, polyvinylidene chloride, butadiene-acrylonitrile copolymer, and organo-silicon resins, contacting the impregnated textile with an aqueous medium to extract the water soluble organic materials leaving microporous openings through the impregnated textile through which vapor but not water is able to pass, and overcoating the textile from which the removable phase has been extracted with a water repellent.

4. The process as claimed in claim 3 in which the water repellent applied as a coating on the surface of the formed textile comprises a quaternary ammonium compound having an organic group attached to the basic nitrogen atom containing at least 10 carbon atoms.

5. The process as claimed in claim 1 which includes the additional step of laminating a plurality of impregnated fabrics from which the removable phase has been extracted by consolidation under heat and pressure.

LAWRENCE P. BIEFELD.
ALBERT R. MORRISON.

References Cited in the file of this patent

UNITED STATES PATENTS

| Number | Name | Date |
|---|---|---|
| 1,950,662 | Dreyfus | Mar. 13, 1934 |
| 2,006,687 | Riddock | July 2, 1935 |
| 2,229,975 | Kaplan | Jan. 28, 1941 |
| 2,306,781 | Francis | Dec. 29, 1942 |
| 2,312,227 | Yant | Feb. 23, 1943 |
| 2,335,102 | Bergin et al. | Nov. 23, 1943 |
| 2,353,877 | Chollar | July 18, 1944 |
| 2,356,542 | Sloan | Aug. 22, 1944 |
| 2,428,591 | Slayter | Oct. 7, 1947 |
| 2,474,201 | Raymond et al. | June 21, 1949 |
| 2,575,577 | Beauchamp | Nov. 20, 1951 |

OTHER REFERENCES

Zimmerman and Lavine, Handbook of Material Trade Names, 1946, pages 84 and 85.